United States Patent [19]

Mergenthaler et al.

[11] Patent Number: 5,779,328
[45] Date of Patent: Jul. 14, 1998

[54] METHOD FOR MONITORING A BRAKE SYSTEM

[75] Inventors: Rolf-Hermann Mergenthaler, Leonberg; Jost Brachert, Ditzingen; Ruediger Poggenburg; Bernard Witsch, both of Vaihingen; Norbert Polzin, Zaberfeld, all of Germany; Robert Kornhaas, Commerce, Mich.; Ulrich Gottwick, Stuttgart; Thomas Braun, Steinheim, both of Germany

[73] Assignee: Robert Bosch GmbH, Stuttgart, Germany

[21] Appl. No.: 774,625

[22] Filed: Dec. 30, 1996

[30] Foreign Application Priority Data

Dec. 30, 1995 [DE] Germany ............... 195 49 172.6
Sep. 19, 1996 [DE] Germany ............... 196 38 196.7

[51] Int. Cl.$^6$ .................. B60T 17/22; B60T 8/88
[52] U.S. Cl. .................. 303/122.12; 303/122.14; 303/10; 303/DIG. 3; 303/116.1; 303/11
[58] Field of Search .............. 303/122.12, 122.13, 303/122.14, 122.1, 122.08, 122.07, 122.03, 10–12, DIG. 3, DIG. 4, 122, 122.09, 116.1, 125, 135; 340/515; 188/1.11 R; 417/44.1, 44.2, 32, 52; 318/611, 606, 608, 615

[56] References Cited

U.S. PATENT DOCUMENTS

| | | | |
|---|---|---|---|
| 3,767,272 | 10/1973 | Leiber | 303/122.1 |
| 3,866,980 | 2/1975 | Eisele et al. | 303/122.1 |
| 3,948,568 | 4/1976 | Leiber | 303/122.1 |
| 4,509,802 | 4/1985 | Solleder et al. | |
| 4,550,954 | 11/1985 | Leiber | 303/122.14 |
| 4,728,156 | 3/1988 | Burgdorf | 303/122.14 |
| 4,832,418 | 5/1989 | Mattusch | 303/122.08 |
| 5,207,485 | 5/1993 | Tröster | 303/116.1 |
| 5,275,476 | 1/1994 | Maisch | 303/113.2 |
| 5,368,374 | 11/1994 | Fujimoto | 303/119.1 |
| 5,413,404 | 5/1995 | Inagawa | 303/122.12 |
| 5,492,395 | 2/1996 | Naruse et al. | 303/122.12 |
| 5,494,343 | 2/1996 | Lindenman et al. | 303/122.12 |
| 5,505,529 | 4/1996 | Siegel et al. | 303/116.2 |
| 5,558,414 | 9/1996 | Kubota | 303/122.12 |
| 5,711,582 | 1/1998 | Kolke | 303/11 |

FOREIGN PATENT DOCUMENTS 9407717  4/1994  WIPO.

*Primary Examiner*—Douglas C. Butler
*Attorney, Agent, or Firm*—Felfe & Lynch

[57] ABSTRACT

In a brake system with a controllable hydraulic pump in a hydraulic circuit, and with at least one solenoid valve, the operating state of the valve is changed in response to a control signal. As a result of the change in the operating state of the solenoid valve, the flow resistance in the hydraulic circuit is changed. Monitoring structure is provided which, in the presence of certain operating conditions, monitor the run-down behavior of the hydraulic pump in different operating states of the solenoid valve and actuate a display device to display a malfunction of the brake system when a malfunction is detected. Additionally, or alternatively, the automatic brake control can be turned off in reaction to the detection of a malfunction. It is possible for the control unit and the hydraulic unit to be replaced separately and for the installation to be tested for proper functioning.

13 Claims, 5 Drawing Sheets

METHOD FOR MONITORING A BRAKE SYSTEM

BACKGROUND OF THE INVENTION

The invention pertains to a system for monitoring a brake system.

Brake systems for preventing the wheels of the vehicle from locking, for controlling the drive slip of the driven wheels, and for controlling the driving dynamics are known, for example, from the article "Antiblockiersystem und Antriebsschlupfregelung der Fünften Generation", ATZ Automobiltechnische Zeitschrift 95 (1993) 11, U.S. Pat. No. 5,505,529, and U.S. Pat. No. 5,275,476. Hydraulic brake systems such as these include solenoid valves, which can be controlled in such a way as to increase and decrease the brake pressure in the individual wheel brake systems, and a return pump, by means of which the brake pressure can be reduced after the solenoid valves have been switched to the appropriate position. The return pump is usually driven by an electric motor (pump motor). It is known from U.S. Pat. No. 5,275,476 that, upon startup of the vehicle, the return pump can be actuated at least once for preselected period of time.

In a brake system of this type, WO 94/07717 discloses that the rpm's of the return pump can be derived from the generator voltage generated by the pump motor as it runs down.

In brake systems such as this, the functions of the solenoid valves and of the pump motor, which are combined into a hydraulic unit, are controlled by a control unit. It is possible for the hydraulic unit to malfunction, however, especially in cases where the control unit has been improperly installed.

SUMMARY OF THE INVENTION

The object of the present invention is to detect a malfunction in the brake system.

The invention is based on a brake system of the type mentioned above with a controllable hydraulic pump, which is installed in a hydraulic circuit, and with at least one solenoid valve, the operating state of which can be changed in response to a control signal. As a result of the change in the operating state of the solenoid valve, the flow resistance in the hydraulic circuit is changed. Monitoring means are provided which, in the presence of certain operating conditions, monitor the run-down behavior of the hydraulic pump in different operating states of the solenoid valve. A display unit is actuated to indicate a malfunction as a function of the determined run-down behavior.

As a result of the invention, it is possible for malfunctions of the brake system to be recognized with a relatively high degree of certainty. These malfunctions can be brought to the attention of the driver of the vehicle. In addition, it is possible for the brake (e.g., antilock), drive, or driving dynamics control to be turned off in response to the detection of a defect. In particular, it is possible as a result of the invention for the control unit and the hydraulic unit to be replaced separately in the repair shop and also for them to be checked to verify that they have been installed correctly. As a result of the invention, the following items can be checked:

whether the solenoid valve switches correctly when its operating state is changed;

whether the pump conveys properly;

whether in the case of a control unit which is mounted on the hydraulic unit (a so-called "external-mount" control unit), this installation has been carried out properly.

The valve coils are usually integrated into such externally mounted control units, whereas the valve bodies are seated in the hydraulic unit. If the external-mount control unit has not been installed or has not been installed correctly, the coils integrated into the external control unit will receive current, but the valve will not switch hydraulically. An inspection which checks only for the presence of current is therefore unsuitable in this case. As a result, high reliability requirements are imposed at present on the replacement of one of these components, i.e., either the external-mount control unit or the hydraulic unit. Thanks to the invention, an installation defect can be detected reliably. Because it is possible as a result of the invention to detect an uninstalled or improperly installed external-mount control unit while it remains part of the system, only the invention makes it possible for the components to be replaced in the field (repair shop, customer service center).

In an advantageous embodiment of the invention, the monitoring means are designed so that, in the presence of the specified operating conditions, the pump is actuated a first time until it reaches a certain first predetermined operating state;

the first run-down behavior of the pump is determined after it has reached the first predetermined operating state;

the solenoid valve is actuated to change its operating state;

the pump is actuated a second time until it reaches a certain second predetermined operating state;

the second run-down behavior of the pump is determined after it has reached the second predetermined operating state; and a display device 14 is actuated to display a malfunction as a function of the comparison between the two run-down behaviors.

The criterion for the presence of the operating conditions can be the longitudinal velocity of the vehicle; that is, the velocity must be below a first threshold value and/or above a second threshold value. An alternative or additional criterion for determining that the operating conditions are present consists in determining whether or not a brake signal, which indicates that the vehicle is being braked, is present. The monitoring according to the invention, which acts on essential actuators of the brake system, therefore occurs at low velocities and/or when the driver does not wish to brake. As a result, it is guaranteed that the monitoring process does not interfere with the normal operation of the vehicle.

The run-down behavior of the pump and/or the first and second times the pump reaches a certain predetermined operating state can be evaluated on the basis of a signal representing the rotational speed of the pump. It is anticipated in particular that the pump will be driven by an electric motor and that the signal representing the speed of the pump will be obtained by an evaluation of the generator voltage generated by the pump motor.

The operating states of the solenoid valve which can be changed in response to the control signal can be characterized in that the solenoid valve is either open or closed.

It can be concluded that the pump has reached a certain predetermined operating state when the rotational speed of the pump or the signal representing the speed of the pump has reached a first predetermined threshold value.

To determine the first and second run-down behaviors of the pump, the rotational speed of the pump or the signal representing the speed of the pump can be compared with a predetermined threshold value.

To determine the first and second run-down behaviors of the pump, the lengths of time it takes for the speed of the pump or the signal representing the speed of the pump to fall to the predetermined second threshold value are measured. Then, to compare the two run-down behaviors with each other, the difference between the measured times can be compared with a third threshold value.

DETAILED DESCRIPTION OF THE PREFERRED EMBODIMENT

Figure 1:
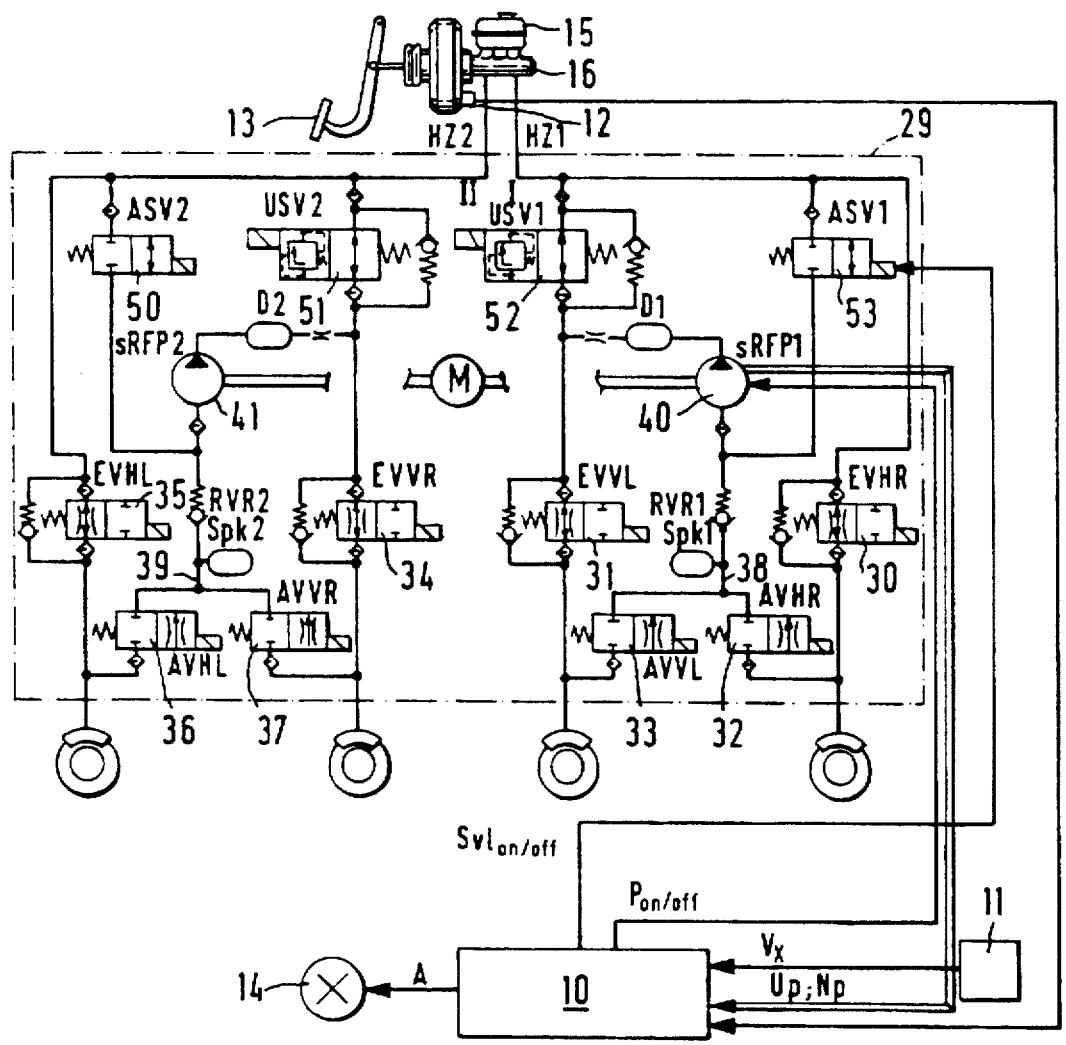
FIG. 1 is a diagram of the brake system and monitoring unit.

FIG. 1 shows a hydraulic brake system with a diagonal division of the two brake circuits; reference number 29 designates a hydraulic unit, shown framed in broken line. The brake system has a pedal-actuated, twin-circuit master brake cylinder 16 with a reservoir 15 for the pressure medium. A first brake circuit I is connected to wheel brakes HR and VL of the right rear and left front wheel, and a second brake circuit II is connected to wheel brakes HL and VR of the left rear and right front wheel. The brake pressure can be supplied to the wheel brakes via unactuated inlet valves EVHL, EVVR, EVVL, EVHR (35, 34, 31, 30). These valves are closed by actuating them, as a result of which the pressure in the wheel brakes can be prevented from increasing further. Through the actuation of outlet valves AVHL, AVVR, AVVL, AVHR (36, 37, 33, 32), the pressure is reduced by return pumps sRFP$_1$ and sRFP$_2$ (40, 41) via return lines 38, 39. The return pumps are driven by electric motor M. It should be pointed out that return pumps sRFP$_1$ and sRFP$_2$ (40, 41) are designed to be self-priming in the known manner. See, for example, FIGS. 4 and 5 of U.S. Pat. No. 5,505,529 and FIG. 2 of U.S. Pat. No. 5,275,476. This means that the return pumps sRFP$_1$ and sRFP$_2$ (40, 41) can convey brake fluid even if there is no inlet pressure. Each return pump is provided with both an intake valve ASV$_1$, ASV$_2$ (53, 54) and a nonreturn valve RVR$_1$, RVR$_2$ (53, 50). Separation from the inlet pressure circuit can be achieved by the actuation of switching valves USV$_1$, USV$_2$ (52, 51). In addition, storage chambers Spk$_1$ and Spk$_2$ and damper chambers D$_1$ and D$_2$ are also provided.

The design of hydraulic unit 29 described above is known in and of itself. Under normal operating conditions of the brake system, the solenoid valves are actuated by a control unit in a manner known in and of itself to prevent the wheels of the vehicle from locking, to control the drive slip of the driven wheels, or to control the driving dynamics. This is not shown in FIG. 1 for sake of clarity. FIG. 1 shows only the elements of the control unit which are necessary for an exemplary description of the teaching according to the invention. In addition, the exemplary embodiment shows only an example of the brake circuit I.

In addition, FIG. 1 shows a monitoring unit 10, which can actuate a display device 14 by means of signal A. Display device 14 can be a signal lamp or warning lamp visible to the driver. Output signals BLS of the brake pedal switch or brake light switch 12 and V$_x$ of a sensor 11, which detects the longitudinal velocity of the vehicle, are sent to monitoring unit 10.

In addition, a signal U$_p$ representing the rpm's N$_p$ of the pump are also sent to monitoring unit 10; this signal is generated by an evaluation of the generator voltage produced by the pump motor in a manner known in and of itself (see WO 94/07717). Monitoring unit 10 controls intake valve ASV$_1$ (53) by sending a signal Svl$_{on/off}$ to open or close the valve. In addition, return pump sRFP$_1$ (40) is also turned on and off by monitoring unit 10 by means of a signal P$_{on/off}$.

Figure 2A:
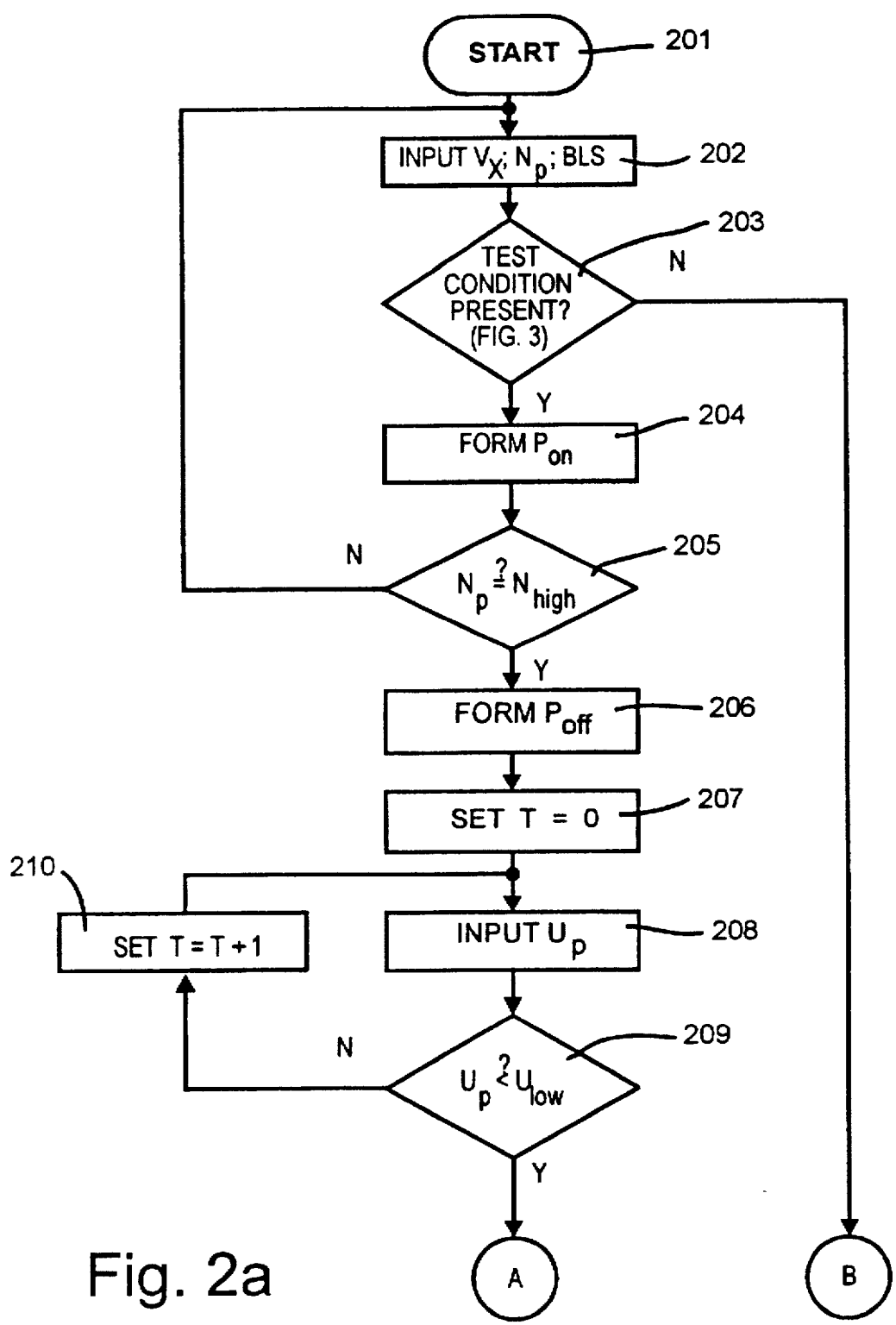
FIGS. 2a, 2b, and 2c depict a detailed sequence of steps for determining a malfunction.
Figure 2B:
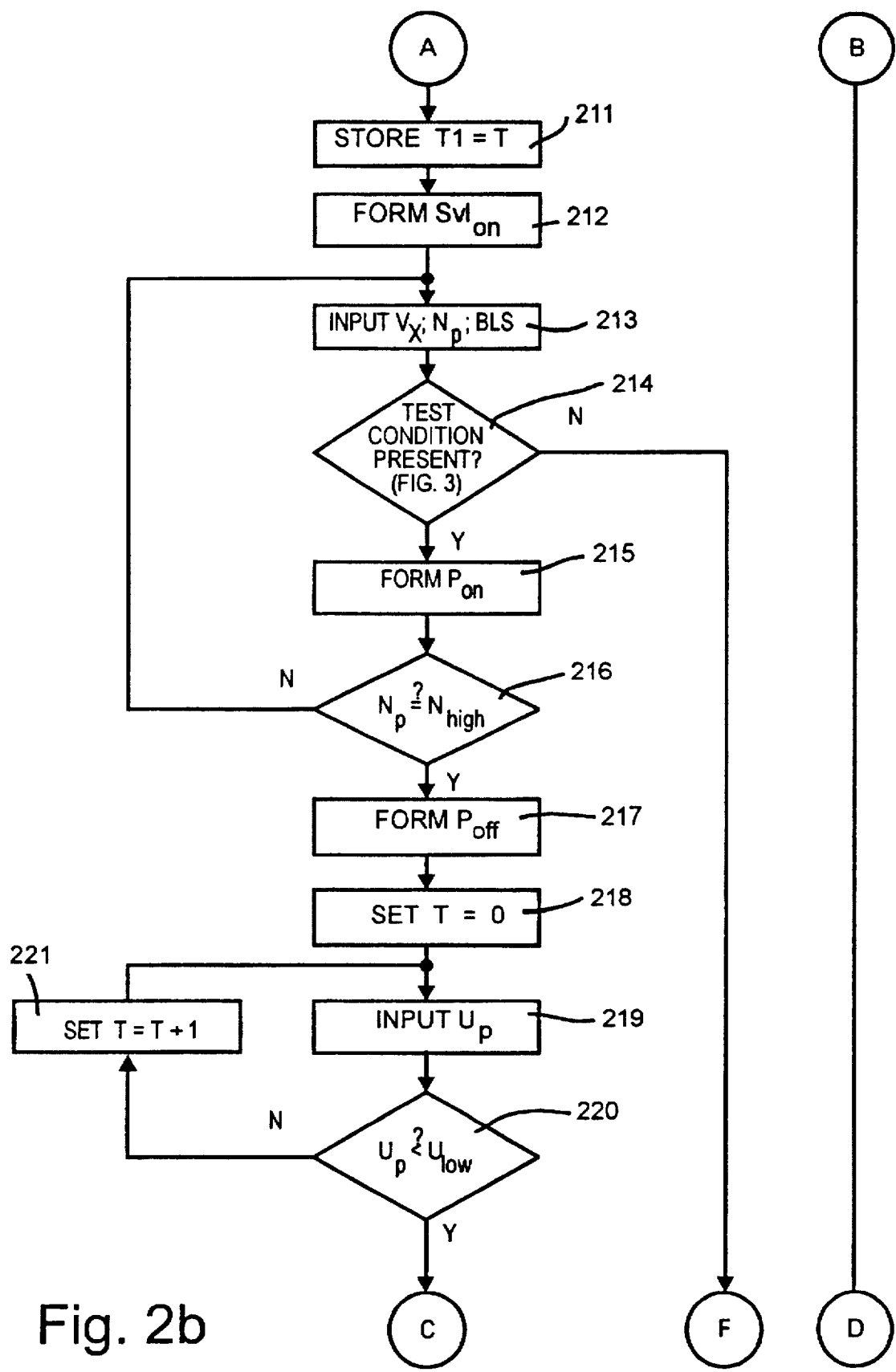
Figure 2C:
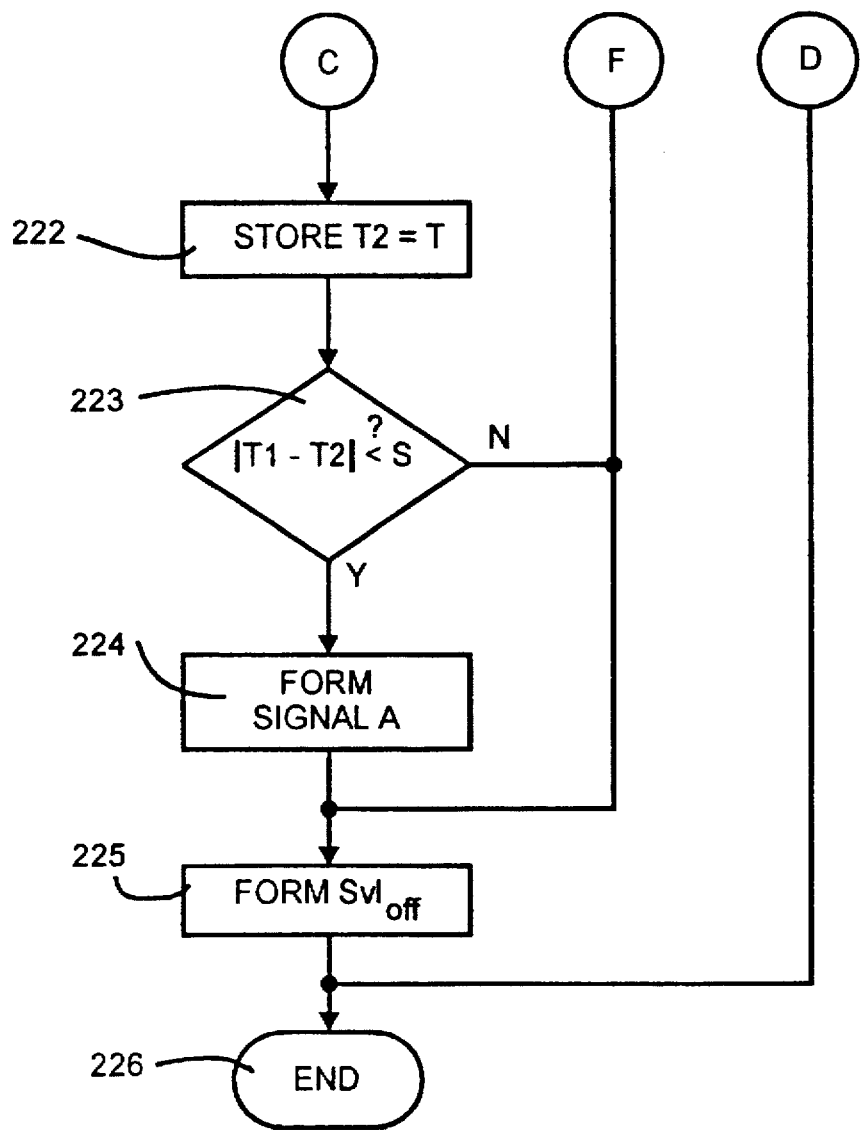

The exact way in which monitoring unit 10 works is explained below on the basis of FIGS. 2 and 3. The monitoring is presented on the basis of brake circuit HZ$_1$ (I). Of course, the other brake circuit HZ$_2$ (II) is monitored in exactly the same way.

After the starting step 201, the current values V$_x$, N$_p$, and BLS for the longitudinal velocity of the vehicle, the pump rpm's, and the brake pedal or brake light switch 12 are accepted as input in step 202. In step 203, the program checks to see whether a predetermined test or monitoring condition is present. How the program checks for the presence of the predetermined test or monitoring condition is explained on the basis of FIG. 3.

If the test or monitoring condition is not present, the program jumps directly to final step 226. If the test or monitoring condition is present, return pump sRFP$_1$ (40), i.e., motor M, is actuated in step 204 through the formation of signal P$_{on}$ until, in step 205, it is found that the speed of the pump has reached a certain threshold N$_{high}$. Once this is so, in step 206 return pump sRFP$_1$ (40), i.e., motor M, is turned off by control signal P$_{off}$, whereupon, in step 207, the counter value T is reset to zero, and steps 208, 209, and 210 are executed at a constant rate. Namely, speed N$_p$ of pump 40 or the generator voltage U$_p$ of motor M standing for this value are accepted as input in step 208, and compared with a threshold value U$_{low}$ or N$_{low}$ in step 209. Each time the loop is processed, counter value T is increased by one unit in step 210. When the speed of the pump speed drops below the threshold, the value T reached by the counter at that particular moment is stored as T$_1$ (step 211).

The program loop (208, 209, 210) has the function of evaluating the run-down behavior of return pump 40 by measuring the length of time T$_1$ it takes for the pump to run down from the original speed N$_{high}$ or U$_{high}$ to the speed N$_{low}$ or U$_{low}$ after it has been turned off (in step 206).

As can be derived from FIG. 1, the outlet valves and the intake valves are closed as long as no current is being supplied. This means that pump 40 runs at idle in reaction to the signal P$_{on}$ generated in step 215, because the hydraulic circuit (D$_1$, EVVL, AVVL, Spk$_1$) is closed.

After the run-down behavior of the pump in response to the first pump actuation has been evaluated, intake valve ASV (53) is opened in step 212 by signal Svl$_{on}$. After the current values V$_x$, N$_p$, and BLS for the longitudinal velocity of the vehicle, the speed of the pump, and the brake pedal or brake light switch 12 have been accepted as input, step 214 checks to see whether or not the predetermined test or monitoring condition (FIG. 3) is present. If the test or monitoring condition is not present, the intake valve is closed in step 225, and the program terminates at step 226. If the test or monitoring condition is present, return pump sRFP$_1$ (40) or motor M is actuated by the formation of signal P$_{on}$ in step 215 until it is established in step 216 that the speed of the pump has reached the specified threshold value N$_{high}$. Once this is so, return pump sRFP$_1$ (40) or motor M is turned off in step 217 by control signal P$_{off}$ whereupon the value T of the counter is set back to zero in step 218, and steps 219, 220, 221 are executed at a constant rate. Namely, the speed $N_p$ of pump 40 or the generator voltage of motor M representing this speed is read in as input in step 219 and compared in step 220 with a threshold value $U_{low}$ or $N_{low}$. Each time the loop is processed, the counter value T is increased by one unit in step 221. When the speed of the pump falls below the threshold value, the value T reached by the counter at that particular moment is stored as $T_2$ (step 222).

In analogy to the first program loop (208, 209, 210), loop (219, 220, 221) evaluates the run-down behavior of return pump 40 by measuring the time $T_2$ it takes for the pump to run down from the original speed $N_{high}$ or $U_{high}$ to speed $N_{low}$ or $U_{low}$ after it has been turned off the second time (step 217). In contrast to the first actuation of the pump, however, the intake valve is open now during this second actuation, as a result of which pump 40 operates in a hydraulic short-circuit during the second run-down.

In step 223, the absolute value of the difference $|T_1-T_2|$ between the two stored run-down times is calculated and compared with a threshold value S. Because the flow resistances of the hydraulic circuit ($D_1$EVVL, AVVL, $Spk_1$) are significantly different during the two pump run-downs, the stored run- down times should also differ significantly from each other. If this is the case, i.e., if the difference $|T_1-T_2|$ exceeds the threshold, the final step 226 is initiated by way of step 225 (the closing of the intake valve), without a malfunction being displayed. But if this is not the case, i.e., if the difference $|T_1-T_{21}|$ does not exceed the threshold, the solenoid valve has obviously not opened in response to actuation $Svl_{on}$. In step 224, therefore, signal A is generated so that display unit 14 will inform the driver of a malfunction and/or the antilock, antislip control, or driving dynamics control system is turned off. After the intake valve has been closed again in step 225, the program terminates at step 226 and is ready to start again.

Figure 3:
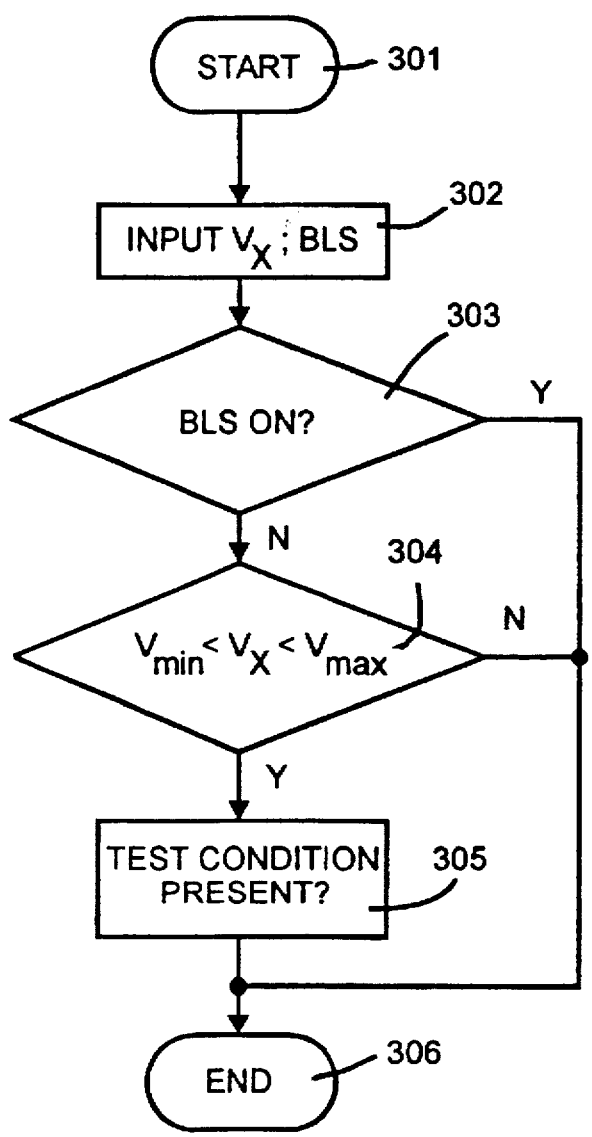
FIG. 3 depicts the sequence for determining whether test conditions are present.

FIG. 3 shows how it is determined whether or not the test or monitoring condition is present. After the starting step 301, the longitudinal vehicle velocity $V_x$ and the status of the brake pedal or brake light switch 12 are read in as input in step 302. Step 303 checks to see whether or not the vehicle is being braked at that particular moment. If braking is in progress, the program jumps immediately to final step 306, which means that the test or monitoring condition is not present.

If the vehicle is not being braked at that particular moment, then in step 304 the program checks to see whether or not the instantaneous longitudinal vehicle velocity $V_x$ is in the range between $V_{min}$ and $V_{max}$. This can be defined as the range between, for example, 20 and 30 km/hr. If this is not the case, the program jumps immediately to final step 306, which means that the test or monitoring condition is not present. If the instantaneous longitudinal vehicle velocity $V_x$ is in the interval between $V_{min}$ and $V_{max}$, then in step 305 the message "test condition present" is sent, which the program requests in steps 203 and 214 of FIG. 2.

At this point it should be mentioned again that the actuation of intake solenoid valves $ASV_1$ and $ASV_2$ has been selected only by way of example. Without departing from the idea of the invention, the other solenoid valves can also be actuated in such a way as to create different flow relationships which lead to differences in the run-down behavior of the return pumps.

In regard to the exemplary embodiment it can be said in summary that the following test is carried out while the vehicle is traveling at a velocity of 20–30 km/h and after an active solenoid valve test known in and of itself has been conducted:

The return pump is actuated twice until it reaches a speed sufficient for an evaluation of the pump's run-down behavior. The first time, the return pump is operated under no-load conditions, that is, without the actuation of the solenoid valves. Then the actuation of the motor relay is cut off, and the time it takes for the pump motor voltage to reach a low level is measured. After a waiting time (not explicitly shown in FIG. 2) of about 100–200 ms, the return pump is operated again, but this time in a hydraulic short-circuit; that is, after at least one outlet valve in the case of an antilock system or one intake valve in the case of a drive slip control system has been actuated. The run-down time is measured again. If the measured values deviate by less than a defined difference from each other, the valve actuation is not working, and thus it cannot be assumed that, for example, the replacement control unit (with monitoring device 10) has been correctly installed. The antilock, drive slip control, or driving dynamics control system is then turned off, and the safety lamp or lamps are turned on.

We claim:

1. Method for monitoring a brake system comprising a hydraulic circuit with a hydraulic pump and at least one solenoid valve having at least two operating states, wherein changing the operating state changes the flow resistance of the hydraulic circuit, said method comprising determining whether at least one specified operating condition is present, determining run-down behavior of the hydraulic pump in a first operating state of the solenoid valve when said at least one specified operating condition is present, determining run-down behavior of the pump in a second operating state of the solenoid valve, comparing said run-down behaviors in said first and second operating states, determining whether a malfunction is present based on said comparison, and actuating a display device when it is determined that a malfunction is present.

2. Method according to claim 1 wherein, in the presence of the at least one specified operating condition, the pump is actuated a first time until it reaches a first predetermined operating state;

the first run-down behavior of the pump is determined after it has reached the first predetermined operating state;

the solenoid valve is actuated to change its operating state;

the pump is actuated a second time until it reaches second predetermined operating state;

the second run-down behavior of the pump is determined after it has reached the second predetermined operating state; and a display device is actuated to display a malfunction as a function of the comparison between the two run-down behaviors.

3. Method according to claim 1 wherein the specified operating condition is determined to be present when the longitudinal velocity of the vehicle ($V_x$) is below a first threshold value ($V_{max}$).

4. Method according to claim 1 wherein, to determine the presence of the operating condition, it is determined whether or not a brake signal (BLS), which indicates that the vehicle is being braked, is present.

5. Method according to claim 1 wherein, to determine the run-down behavior of the pump ($sRFP_1$), a signal ($U_p$) representing the speed ($N_p$) of the pump is evaluated.

6. Method according to claim 5 wherein the predetermined operating state of the pump ($sRFP_1$) is reached when the speed ($N_p$) of the pump or the signal ($U_p$) representing the speed ($N_p$) of the pump has reached a predefinable first threshold value ($N_{high}$).

7. Method according to claim 5 wherein, to determine the first and second run-down behavior of the pump, the speed ($N_p$) of the pump or the signal ($U_p$) representing the speed ($N_p$) of the pump is compared with a predefinable threshold value ($N_{low}$).

8. Method according to claim 7 wherein, to determine the first and second run-down behavior of the pump, the lengths of time ($T_1$, $T_2$) it takes for the speed ($N_p$) of the pump or for the signal ($U_p$) representing the speed ($N_p$) of pump to fall to the predefinable second threshold value ($N_{low}$) are measured, and in that, to compare the two run-down behaviors with each other, the difference ($|T_1-T_2|$) between the two measured times is compared with a third threshold value (S).

9. Method according to claim 1 wherein the pump is driven by an electric motor (M), and a signal ($U_p$) representing the speed ($N_p$) of the pump is obtained by an evaluation of the generator voltage produced by the pump motor.

10. Method according to claim 1 wherein the operating states of the solenoid valve (ASV) are the solenoid valve being either open or closed.

11. The method according to claim 1, wherein the specified operating condition is determined to be present when the longitudinal velocity of the vehicle is above a threshold value ($V_{min}$).

12. The method according to claim 1, wherein the specified operating condition is determined to be present when the longitudinal velocity of the vehicle is within a range between a first threshold value ($V_{max}$) and a second threshold value ($V_{min}$).

13. The method according to claim 1, wherein the first or second time the pump ($sRFP_1$) reaches the determined operating state, a signal (use of P) representing the speed ($N_p$) of the pump is evaluated.

* * * * *